(No Model.)
E. G. NICHOLS.
MASON'S AND BUILDER'S IMPLEMENT.
No. 595,860. Patented Dec. 21, 1897.
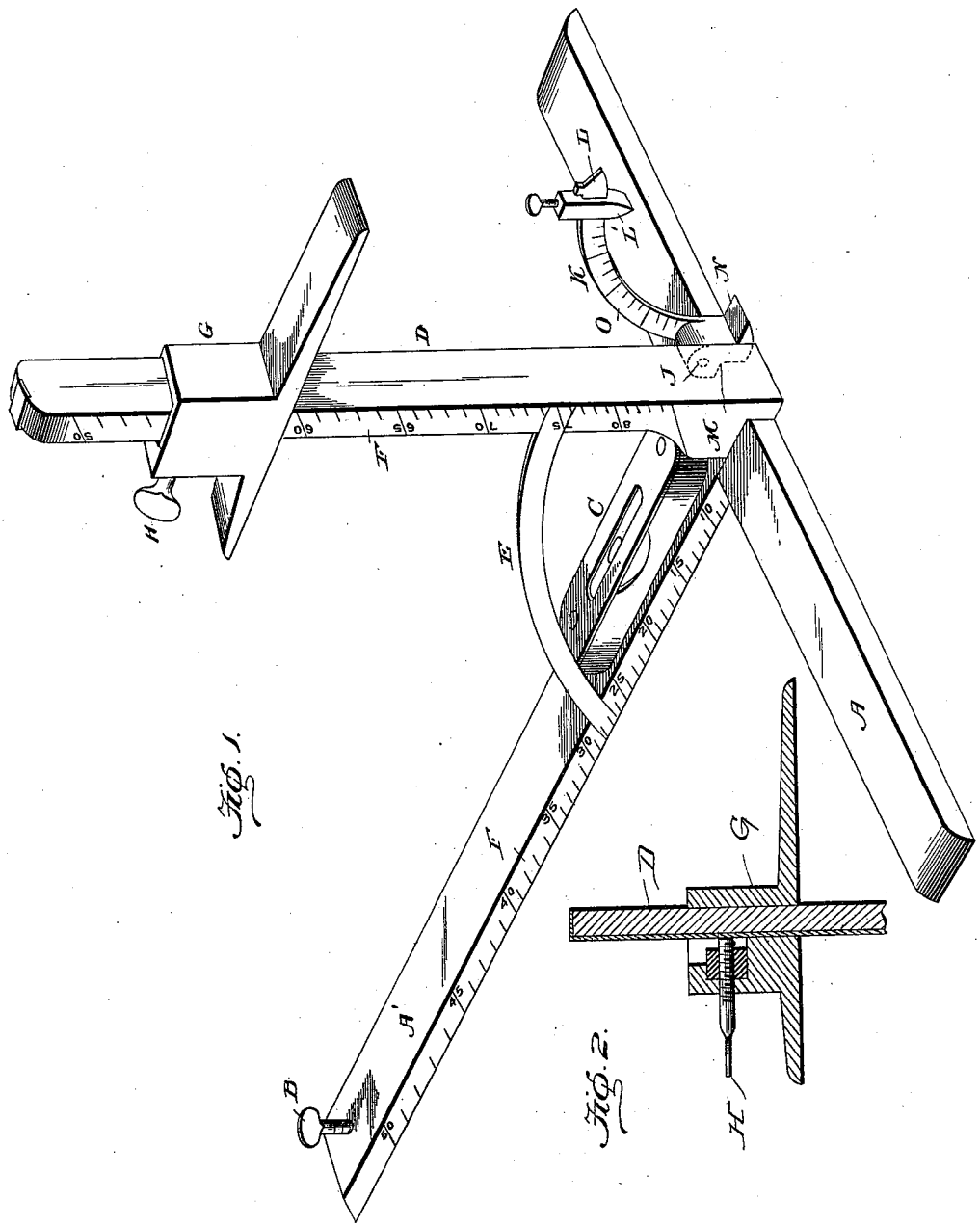
Witnesses:
Eugene G. Nichols,
Inventor

UNITED STATES PATENT OFFICE.

EUGENE G. NICHOLS, OF CENTRAL CITY, WEST VIRGINIA.

MASON'S AND BUILDER'S IMPLEMENT.

SPECIFICATION forming part of Letters Patent No. 595,860, dated December 21, 1897.

Application filed July 29, 1897. Serial No. 646,377. (No model.)

*To all whom it may concern:*

Be it known that I, EUGENE G. NICHOLS, a citizen of the United States, residing at Central City, in the county of Cabell and State of West Virginia, have invented certain new and useful Improvements in Masons' and Builders' Implements; and I do hereby declare the following to be a full, clear, and exact description of the invention, such as will enable others skilled in the art to which it appertains to make and use the same.

My invention relates to improvements in masons' and builders' implements, and has special reference to a leveling instrument for masonry, although I would have it understood that the level may be used in any situation wherever it would perform its functions in a proper manner.

One object of my invention is the provision of an instrument by means of which the level may be ascertained upon even or uneven ground in a perfect manner; also, by means of which the heights of courses may be ascertained and which will give the degrees of slant or incline.

Another object of my invention is the provision of an instrument which will be of simple, inexpensive, and durable construction and which will be thoroughly efficient and practical for the intended purposes.

The invention consists of an instrument embodying novel features of construction and combination of parts substantially as disclosed herein.

Figure 1 represents a perspective view of my improved leveling instrument. Fig. 2 represents a vertical central sectional view of a part thereof.

The level rest or base is preferably made in the form of a T and consists of the front transverse bar A and the central longitudinal bar A', the latter being provided near its end with an adjusting-screw B, the purpose of which is to regulate the rest according to the surface of the ground as to unevenness. Mounted upon said arm or bar A' near its forward end is a spirit-level C, of any desired construction, and rising from said rest or support is the vertical upright or standard D, which is suitably secured and braced by means of the curved brace E. The bars A and A' are provided, respectively, with a graduated scale F, which have the marks thereof arranged at an incline. Mounted upon the upright is a movable head G, which is adjustable at any point upon the upright and can be retained in proper place by means of the set-screw H, and by this device it is evident that courses of any width or height can be ascertained and regulated as well as the proper level obtained. On one side of the upright is pivoted at J the curved arm K, having at its upper end the point L, and also having a notch or recess M and a foot-piece N at the lower end, and the pivoted arm is further provided with a scale O and a movable or adjustable marker L'. These parts constitute a device for ascertaining different angles of degree within ninety (90) graduations of an arc of a circle. The device is used in connection with a line or straightedge.

The graduations on the pivoted arc-arm are used to denote the different angles of curves and archways over doors, windows, and the like, and this feature is very important in the construction of small curves and arches, as it can be very readily put into use and thrown out of use and also out of the way at the same time.

I claim—

1. A leveling instrument consisting of the base or rest composed of the transversely and longitudinally disposed bars, the level carried by the longitudinal bar, the upright or standard rising from the rest, graduated scales on the standard and longitudinal bars, and an adjustable head on the upright.

2. A leveling instrument consisting of the base or rest composed of the transversely and longitudinally disposed bars, the level carried by the longitudinal bar, the upright or standard rising from the rest, graduated scales on the standard and longitudinal bars, an adjustable head on the upright, and the arm pivoted to the upright provided with a scale and having an adjustable marker mounted thereon.

3. A leveling instrument consisting of the T-shaped base, the standard rising therefrom and carrying a scale, an adjustable head slidably mounted thereon and having a short and long arm and means to hold the head at any adjustment, the spirit-level mounted on the long arm of the base, and the pivoted arc-arm secured to the standard and carrying a marking means.

4. A leveling instrument consisting of the T-shaped base, a level mounted on the long arm of said base, means to raise and lower said long arm so as to find the level of the object, a standard rising from the base where the short and long arms are joined together having a graduated scale marked thereon, an adjustable head secured on said standard and having means to hold it at any height on the standard, and a pivoted arm secured at the base of said standard and having a marker adjustably mounted thereon.

In testimony whereof I affix my signature in presence of two witnesses.

EUGENE G. NICHOLS.

Witnesses:
M. J. O'GRADY,
O. D. CARTER.